US012195312B1

(12) United States Patent
Meyerink

(10) Patent No.: US 12,195,312 B1
(45) Date of Patent: Jan. 14, 2025

(54) PERSONNEL LIFT FOR AGRICULTURAL VEHICLES AND THE LIKE

(71) Applicant: Dave Meyerink, Platte, SD (US)

(72) Inventor: Dave Meyerink, Platte, SD (US)

( * ) Notice: Subject to any disclaimer, the term of this patent is extended or adjusted under 35 U.S.C. 154(b) by 1029 days.

(21) Appl. No.: 17/076,791

(22) Filed: Oct. 21, 2020

Related U.S. Application Data

(60) Provisional application No. 62/924,307, filed on Oct. 22, 2019.

(51) Int. Cl.
*B66F 11/04* (2006.01)
*B66F 17/00* (2006.01)

(52) U.S. Cl.
CPC ............ *B66F 11/04* (2013.01); *B66F 17/006* (2013.01)

(58) Field of Classification Search
CPC ... E04G 1/20; E04G 1/22; B66F 11/04; B66F 17/006; B66F 2700/12; A01D 46/20; A01D 91/04
See application file for complete search history.

(56) References Cited

U.S. PATENT DOCUMENTS 3,004,443 A * 10/1961 Gerrans .................... F16H 7/14 74/30
3,934,681 A * 1/1976 Herrell .................... B66F 9/127 187/253
3,987,913 A * 10/1976 Lickfold ................... B66F 9/10 414/544
5,271,482 A * 12/1993 Walz ......................... E04G 1/20 182/69.6
2007/0166138 A1* 7/2007 Brooks ................... B66F 9/082 414/471
2008/0302601 A1* 12/2008 Baker ....................... B66B 9/16 182/127
2008/0314690 A1* 12/2008 Campbell ............. B66F 17/006 187/233
2019/0387677 A1* 12/2019 Klein ..................... A01G 31/06

FOREIGN PATENT DOCUMENTS

KR 20160106440 A * 9/2016 .......... B66F 9/07581

OTHER PUBLICATIONS

KR20160106440A English translation (Year: 2016).*

* cited by examiner

*Primary Examiner* — Brian D Mattei
*Assistant Examiner* — Jacob G Sweeney
(74) *Attorney, Agent, or Firm* — Carl A. Hjort, III

(57) ABSTRACT

A personnel lift for agricultural vehicles is shown and described. The lift includes a main column; an electric motor with a first sprocket coupled to the main column; an idler bracket with a second sprocket coupled to the main column. A roller box assembly is disposed inside the main column, with upper and lower chain attachment points and a first roller disposed in the roller box. A roller chain is connected to the upper and lower chain attachment points and in a continuous loop over the first and second sprockets. Upper and lower mounting brackets are provided to mount the personnel lift to a specific make and model of agricultural vehicle. A lifting platform with a support column is provided and two intermediate supports couple the support column to the roller box, the intermediate supports have a second roller.

17 Claims, 10 Drawing Sheets

PERSONNEL LIFT FOR AGRICULTURAL VEHICLES AND THE LIKE

CROSS REFERENCE TO RELATED APPLICATIONS

The present application claims the benefits of U.S. Provisional Application Ser. No. 62/924,307, filed Oct. 22, 2019, entitled "Personnel Lift for Agricultural Vehicles and the Like" and which is incorporated herein by this reference in its entirety.

DETAILED DESCRIPTION OF THE DRAWINGS

Embodiments of a personnel lift for agricultural vehicles are shown and described. Generally, personnel lift includes a main column with a top end, a bottom end, an open interior space and having two opposing interior surfaces and a front exterior surface and left and right exterior surfaces. A motor mounting bracket is coupled to the top end of the main column. An electric motor is coupled to the motor mounting bracket and has an output shaft coupled to a first sprocket. An idler bracket is coupled to the bottom end of the main column, said idler bracket having a second sprocket. A roller box assembly is disposed in the open interior space of the main column, said roller box assembly having a generally rectangular body with an open interior, an upper exterior surface and a lower exterior surface, wherein said upper exterior surface has an upper chain attachment point and said lower exterior surface has a lower chain attachment point, and wherein the roller box assembly has a first roller disposed in the open interior thereof. A roller chain is disposed on the first and second sprockets, said roller chain connected to the upper and lower chain attachment points on the roller box assembly, said roller chain being in a continuous loop. An upper mounting bracket is connected to the main column, wherein said upper mounting bracket connects the main column to an agricultural vehicle, and wherein said upper mounting bracket is adapted to mount the personnel lift to a specific make and model of agricultural vehicle. A lower mounting bracket is connected to the main column, wherein said lower mounting bracket connects the main column to an agricultural vehicle, and wherein said lower mounting bracket is adapted to mount the personnel lift to a specific make and model of agricultural vehicle. A lifting platform is provided with a support column attached thereto. Two intermediate supports couple the support column of the lifting platform to the roller box assembly, said intermediate supports having guides which ride against the left and right exterior surfaces of the main column, wherein said intermediate supports have a second roller attached thereto; and wherein the first roller contacts the opposing interior surfaces of the main column and the second roller contacts the front exterior surface of the main column.

Figure 1:
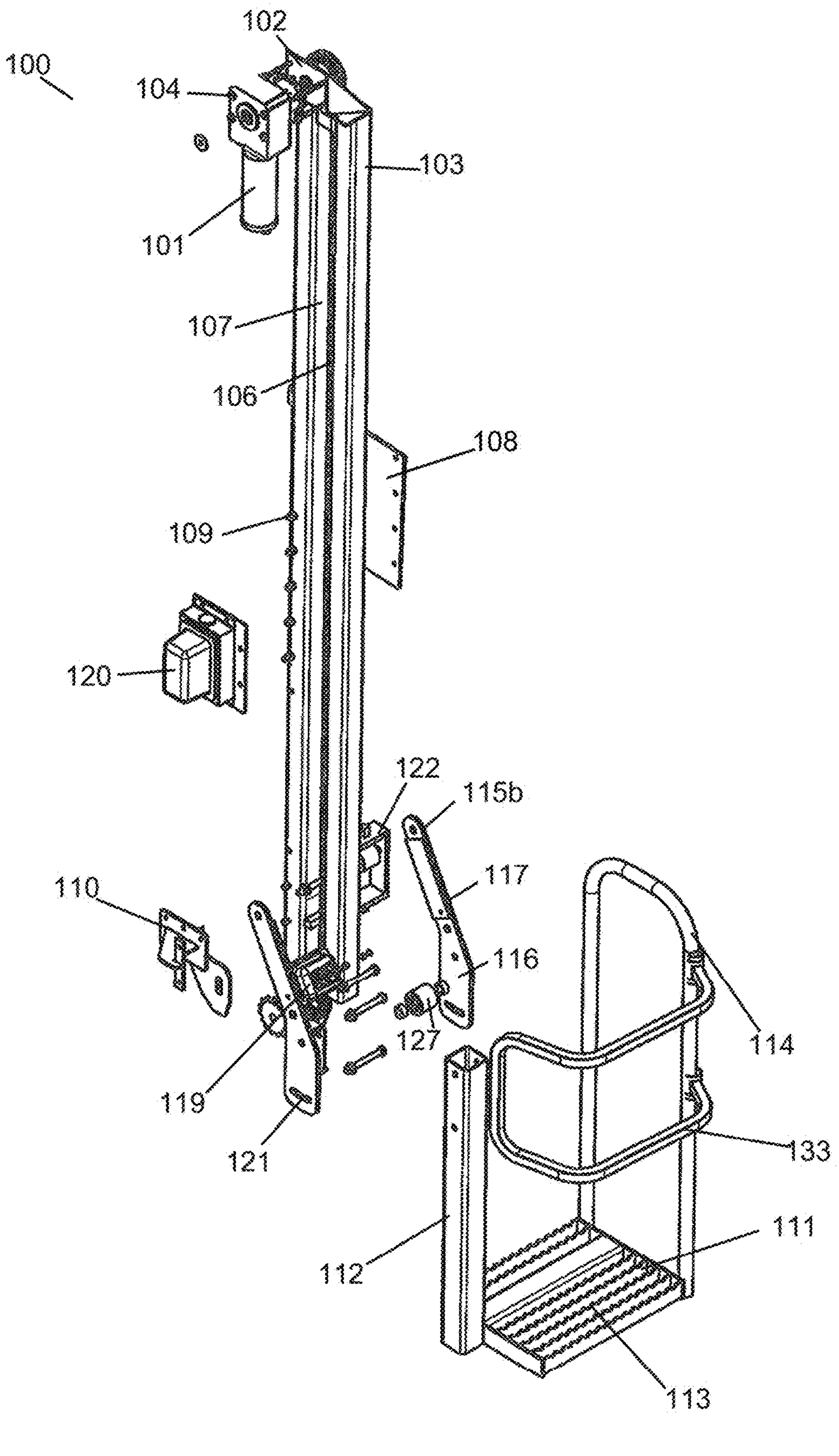
FIG. 1 is a left perspective exploded view of an embodiment of a personnel lift for agricultural vehicles.
Figure 2:
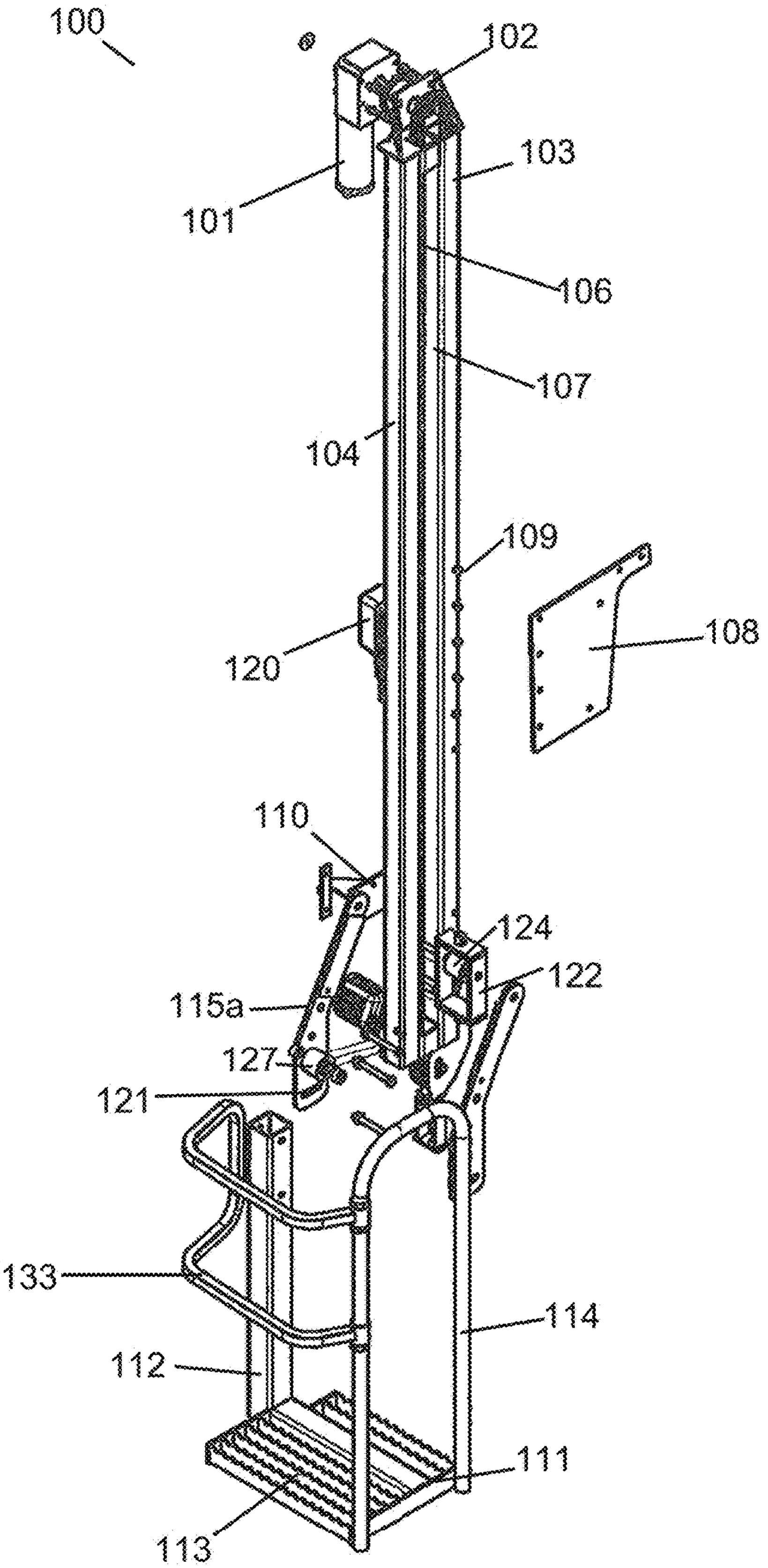
FIG. 2 is a right perspective exploded view of an embodiment of a personnel lift for agricultural vehicles.
Figure 7:
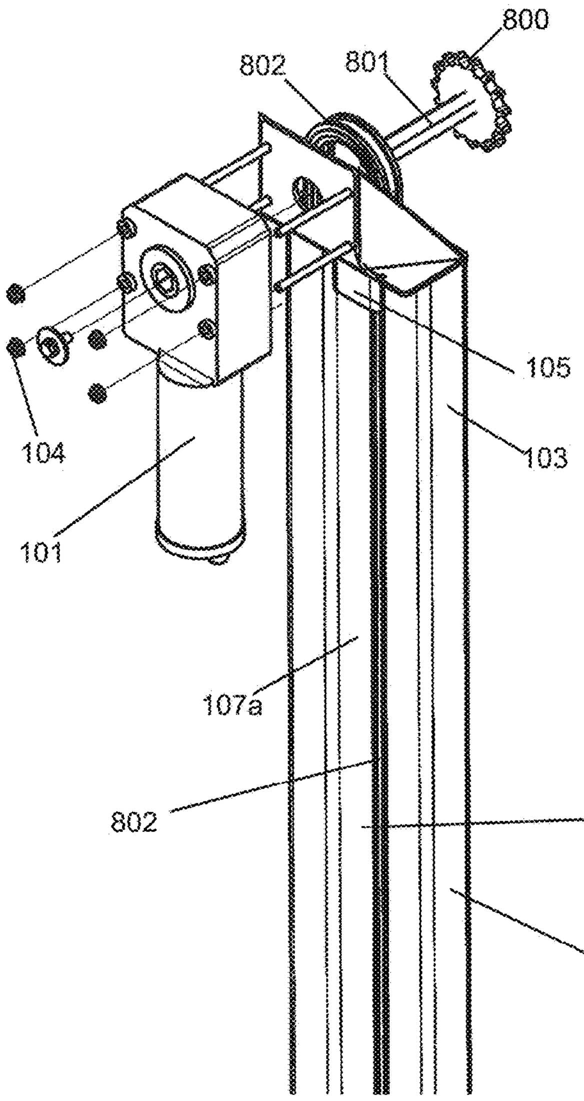
FIG. 7 is an enlarged left perspective exploded view of the upper mechanism of an embodiment of a personnel lift for agricultural vehicles.
Figure 8:
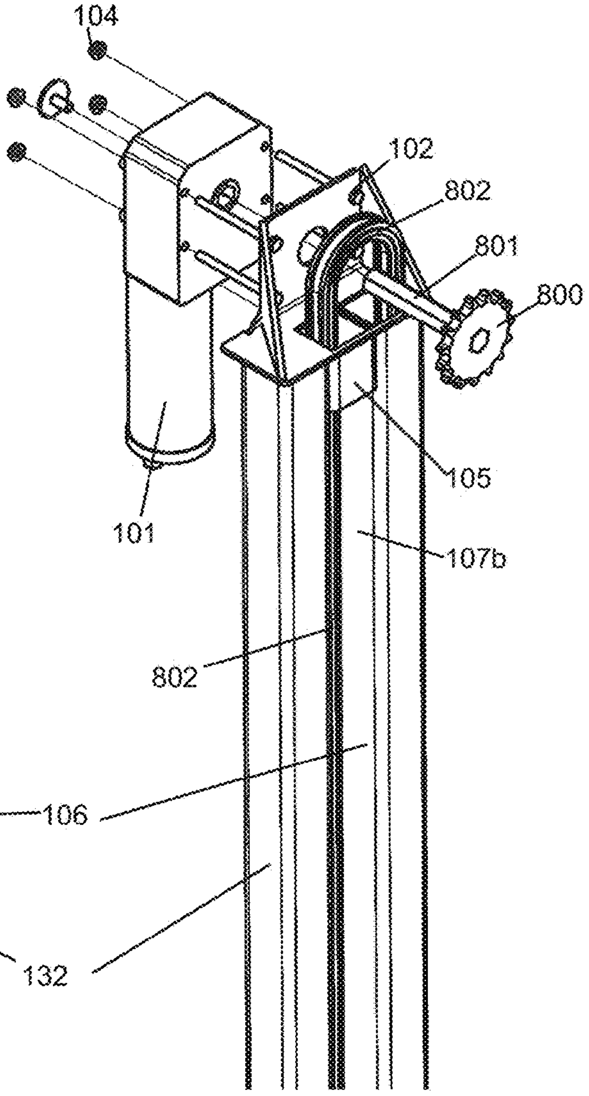
FIG. 8 is an enlarged right perspective exploded view of the upper mechanism of an embodiment of a personnel lift for agricultural vehicles.

FIGS. 1 and 2 show left and right perspective exploded views of an embodiment of the personnel lift 100 for agricultural vehicles and the like. Like numerals will be used to identify elements common to all figures. Thus, in both FIGS. 1 and 2, the motor 101 is shown. Motor 101 may take the form of a 12 VDC gear reduction motor such as the IronSide 2 motor manufactured by Shur-Co, LLC. It should be appreciated that any motor with the necessary torque to operate the lifting mechanism may be used as the motor 101. The motor 101 is fastened to a motor mounting bracket 102 at the top of the main column 103 by fasteners 104. Referring now to FIGS. 7 and 8, the output of the motor 101 is coupled to a 15-tooth sprocket 800 by a hex-shaft 801. In operation, the motor 101 turns the sprocket 800 which is in turn engaged with a roller chain 802. The motor 101 may be powered by a battery (not shown) which is dedicated for use in the personnel lift 100, or it may be powered by the electrical system of the associated agricultural vehicle.

As previously discussed, and still referring to FIGS. 7 and 8, the motor 101 is coupled to the top of the main column 103. The main column 103 may be formed from square tubes 132 spaced apart by spacer 105 to form an open interior space 106 with interior surfaces 107*a* and 107*b*. As will discussed below, a roller assembly is disposed in the open interior space 106. Also provided in the interior space is a roller chain 802. The roller chain 802 may, for example, be a #60 standard roller chain. It should be appreciated that the roller chain 802 is formed in one continuous loop and is engaged with the sprocket 800 at the top, as previously described, and another sprocket (element 500) at the bottom, as will be described below. Thus, when the motor 101 rotates the connected top sprocket 800 in either a clockwise or counterclockwise rotation, a selected point on the chain will translate vertically up or down.

Also shown in FIGS. 1 and 2 is the upper mounting bracket 108. The upper mounting bracket 108 is secured by fasteners (not shown) into holes 109 in the main column 103. The upper mounting bracket 108 is designed to mount the personnel lift 100 to a specific make and model of agricultural vehicle. Examples of specific agricultural vehicles that may be equipped with the personnel lift are John Deere or Case IH combines. The shape and pattern of bolt holes on the upper mounting bracket 108 will differ depending on the specific make and model of agricultural vehicle the personnel lift is installed on. Additionally, FIGS. 1, 2, 3, 5 and 6 show a lower mount bracket 110. As with the upper mounting bracket 108, the lower mounting bracket 110 may be designed to mount the personnel lift 100 to a specific make and model of agricultural vehicle. The shape and pattern of bolt holes on the lower mounting bracket 110 will differ depending on the specific make a model of agricultural vehicle the personnel lift is installed on. In operation, the user may be provided with a plurality of different upper and lower mounting brackets 108, 110 and may select and mount the appropriate brackets for his/her specific application.

As shown in FIGS. 1 and 2, the assembly is provided with a lifting platform 111. The lifting platform 111 is comprised of the support column 112, the platform area 113, and the railing 114, with a moveable safety rail 133. The support column 112 may be fabricated from, for example, square tube, and it attaches to the intermediate supports, as disclosed below. The platform area 113 may be made of any suitable material, for example, metal grating. The platform area 113 may, for example, be approximately 18 inches by 18 inches, to allow a person to comfortably stand on the platform area 113 while the personnel lift 100 is in operation. The railing 114 is provided to prevent falls off the personnel lift 100 while it is in operation and may be formed from any suitable material, for example, metal tubing. An optional safety strap (not shown) may be provided to provide additional protection from falls during operation of the personnel lift 100. The moveable safety rail 133 may provide additional fall protection. The moveable safety rail 133 may be hingedly connected to the railing 114 and be rotated out of position to allow a user to step onto the platform 113, and then rotated into position to prevent the user from falling off the platform 113 during operation of the lift.

FIGS. 1 and 2 and 5 and 6 show the intermediate supports 115*a,b* which couple the lifting platform 111 to the roller assembly disposed inside the main column 103. The intermediate supports 115*a,b* have a generally vertical portion 116 and an angled portion 117. The assembly is provided with left and right intermediate supports 115*a, b*. Disposed on the interior surface of each of the intermediate supports 115 and specifically on the angled portion 117 thereof are Ultra High Molecular Weight Polyethylene guides 118 which act as a smooth bearing surface between the intermediate supports 115*a,b* and the left and right side surfaces of the main column 103 that the intermediate supports 115*a,b* ride against as they move up and down during the operation of the personnel lift 100. As can be seen most clearly in FIGS. 5 and 6, the left side intermediate support 115*a* further comprises an up/down switch 119. An additional switch 120 is mounted near the upper mounting bracket 108. The support column 112 of the lifting platform 111 is coupled to the generally vertical portion 116 of the intermediate supports 115. The intermediate supports 115 are provided with an elongated slot 121 which allows for the adjustment of the lifting platform 111 relative to the intermediate supports 115. In this way, the lifting platform 111 can be made generally level, in relation to the ground, even if the main column 103 is not perpendicular to the ground surface.

Captured between the intermediate supports 115, and in the open interior space 106 of the main column 103, is a roller box assembly 122. The roller box assembly 122 comprises a generally rectangular box 123 with open front and rear sides and a roller 124 disposed therein. A bolt 125 may pass through the right and left intermediate supports 115*a, b*, through holes in the left and right sides of the roller box assembly (not shown) and act as an axle for the roller 124 to rotate on. The roller 124 contacts the interior surfaces 107*a,b* of the main column 103, and provides a low friction bearing surface against the interior surfaces 107*a,b*, as the assembly moves up and down during operation of the personnel lift 100. The roller box assembly 122 is also provided with chain attachment points 126*a, b* on the upper and lower exterior surfaces of the roller box assembly 122. The roller chain 802 is connected to these attachment points 126*a, b* and, as discussed above, the roller box assembly 122 translates vertically up and down, when the chain is driven by motor 101 at the top of the assembly.

A second roller 127 is also provided in engagement with the intermediate supports 115*a,b*. As can be seen most clearly in FIGS. 5 and 6, the second roller 127 may be disposed between the intermediate supports 115*a,b* and in engagement with the front outer surface 128 of the main column 103. A bolt 129, passing through the intermediate supports 115, spacers 130 and the bore 131 of second roller 127 acts as an axle for second roller 127 to rotate about. The second roller 127 contacts the outer surface 128 of the main column 103, and provides a low friction bearing surface against the outer surface 128, as the assembly moves up and down during operation of the personnel lift 100.

Figure 3:
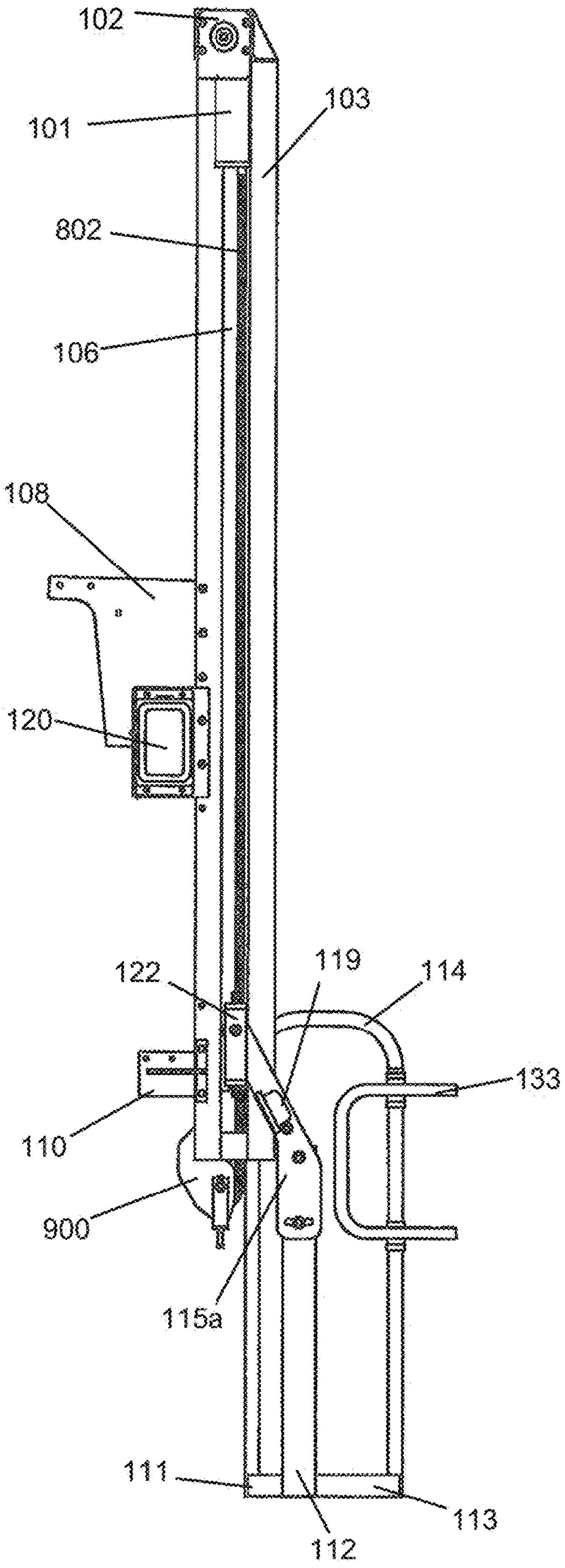
FIG. 3 is a left side assembled view of an embodiment of a personnel lift for agricultural vehicles.
Figure 5:
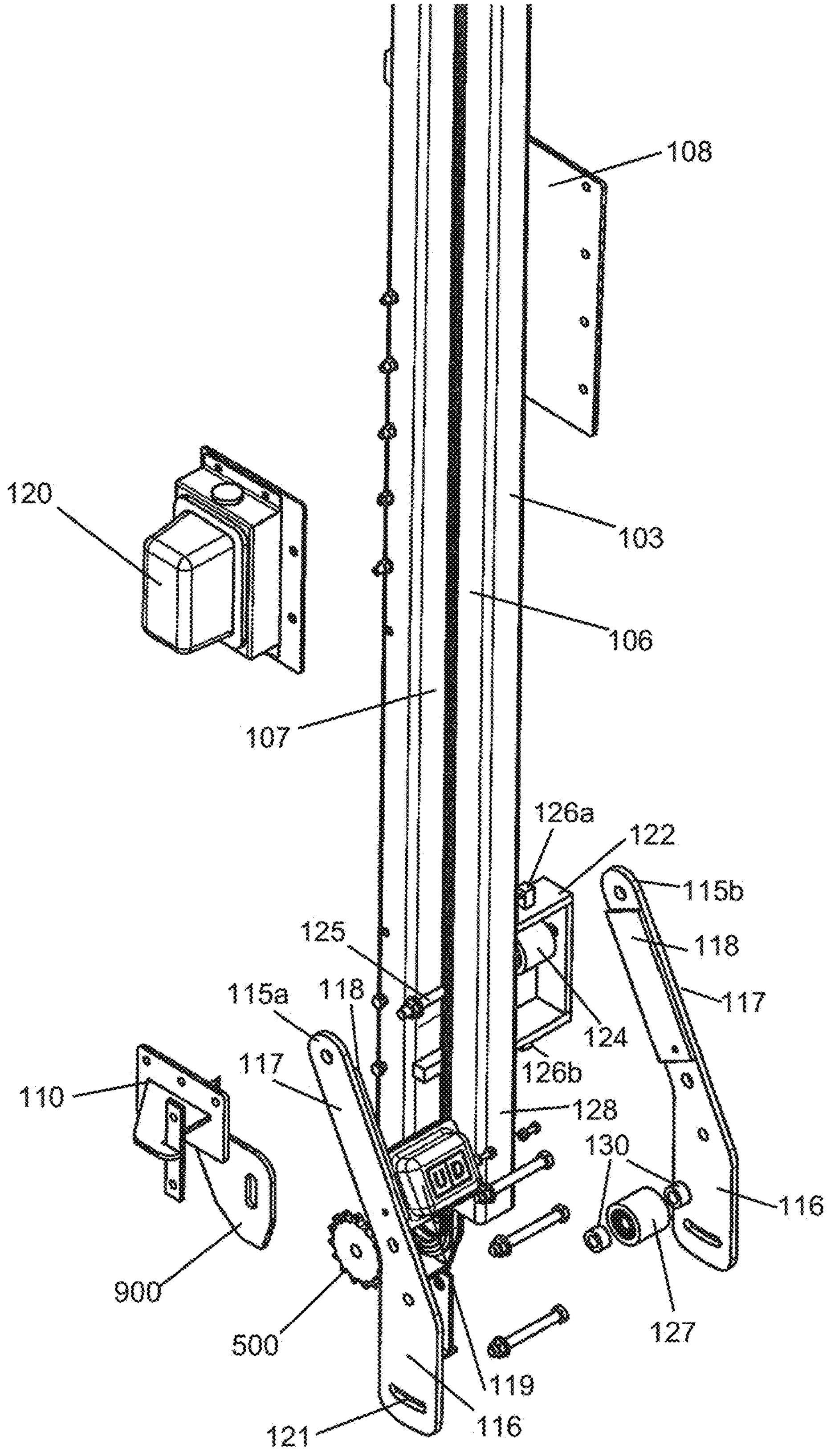
FIG. 5 is an enlarged left perspective exploded view of the lower mechanism of an embodiment of a personnel lift for agricultural vehicles.
Figure 6:
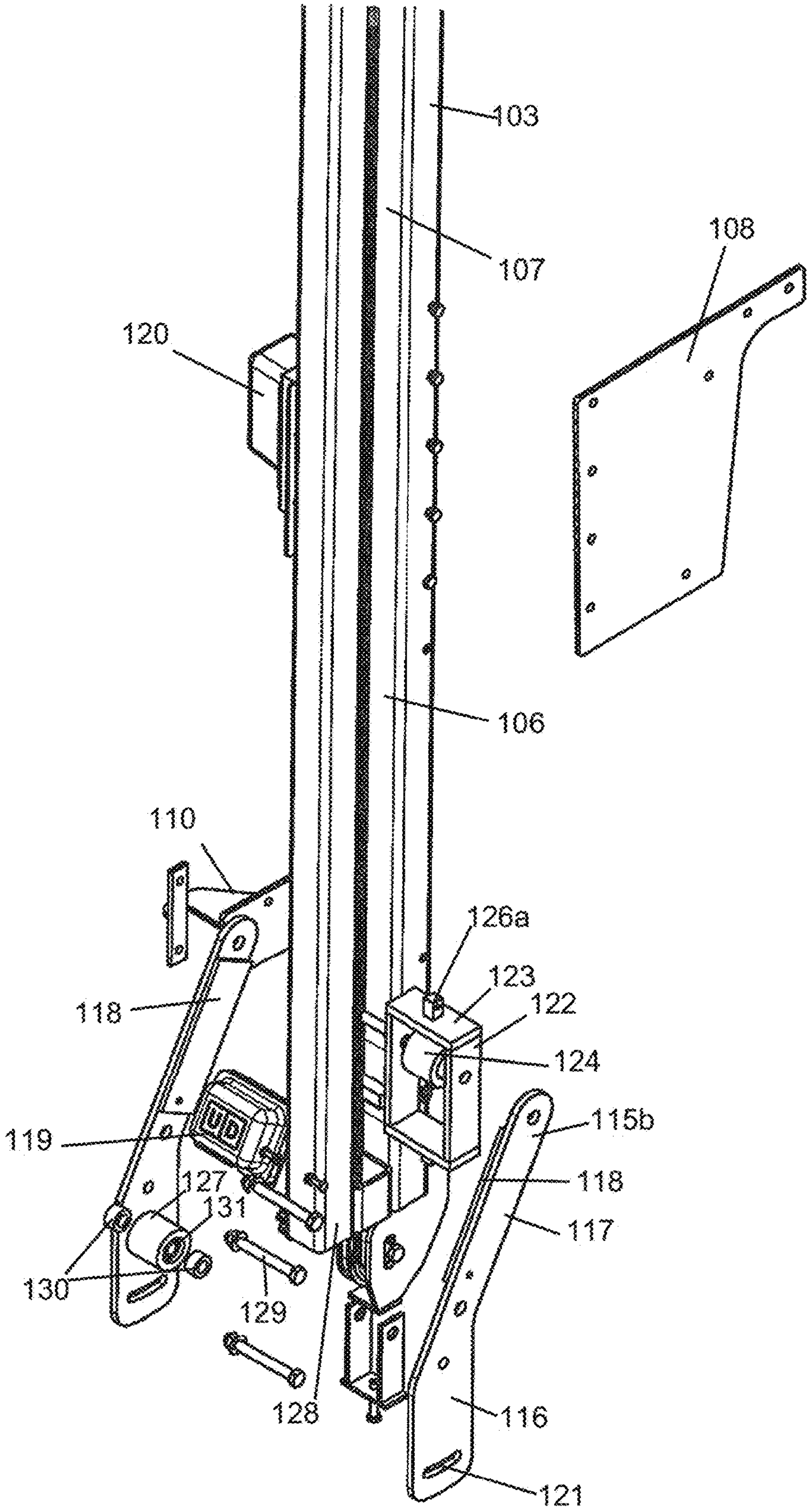
FIG. 6 is an enlarged right perspective exploded view of the lower mechanism of an embodiment of a personnel lift for agricultural vehicles.

As can be seen in FIGS. 3 and 5, an idler bracket 900 may also be provided in the assembly. The idler bracket 900 has a slot (discussed below) and a sprocket 500 shown in FIG. 5 interior to the idler bracket 900 and engaged with the roller chain 802. In operation, the vertical location of the sprocket can be varied by adjusting the location of the axle of sprocket 500 in the slot, so that the tension of the roller chain 802 may be varied by making such adjustments.

Figure 9:
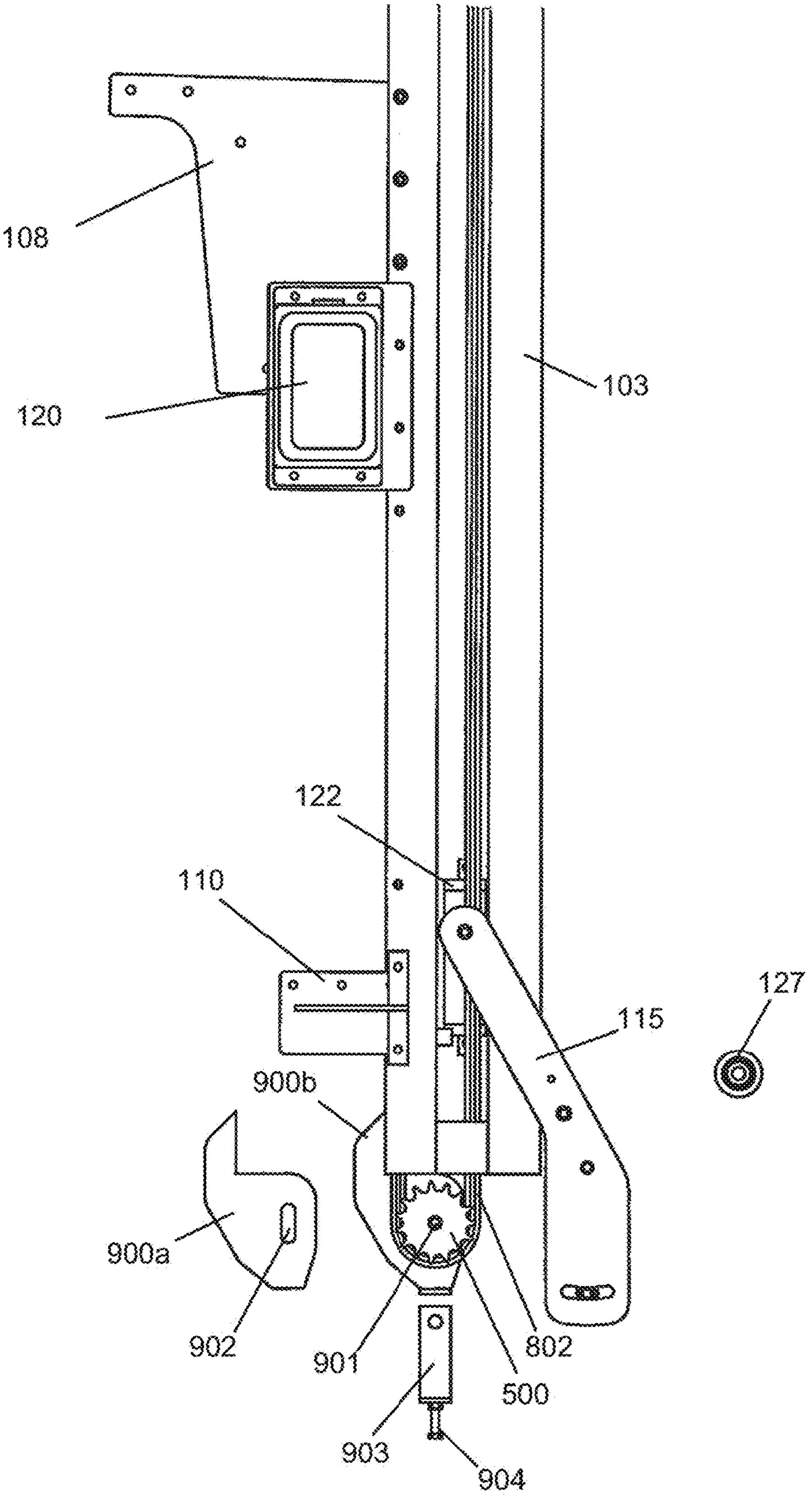
FIG. 9 is a partially exploded side view of the idler bracket assembly of an embodiment of a personnel lift for agricultural vehicles.

FIG. 9 shows a partially exploded side view of the idler bracket 900 previously identified. Like numerals will be used to identify elements already identified in previous figures. Thus, FIG. 9 shows the main column 103, with lower mounting bracket 110, the intermediate support 115 connected to roller box assembly 122 and the switch box 120. The idler bracket assembly 900 is composed of left and right idler brackets 900*a* and 900*b*. Disposed between the idler brackets 900*a, b* is the lower sprocket 500, around which the roller chain 802 is positioned. The lower sprocket 500 has an axle 901, which, when assembled, rides in slot 902. It should be appreciated that a similar slot is provided on bracket 900*b*, but is not visible in FIG. 9. Tensioner 903 may be adjusted by means of bolt 904, which adjusts the position of axle 901 in slot 902 on the idler bracket 900. In this way, the vertical position of the lower sprocket 500 can be adjusted up and down, and thereby, the tension of the roller chain 802 can be adjusted.

Figure 4:
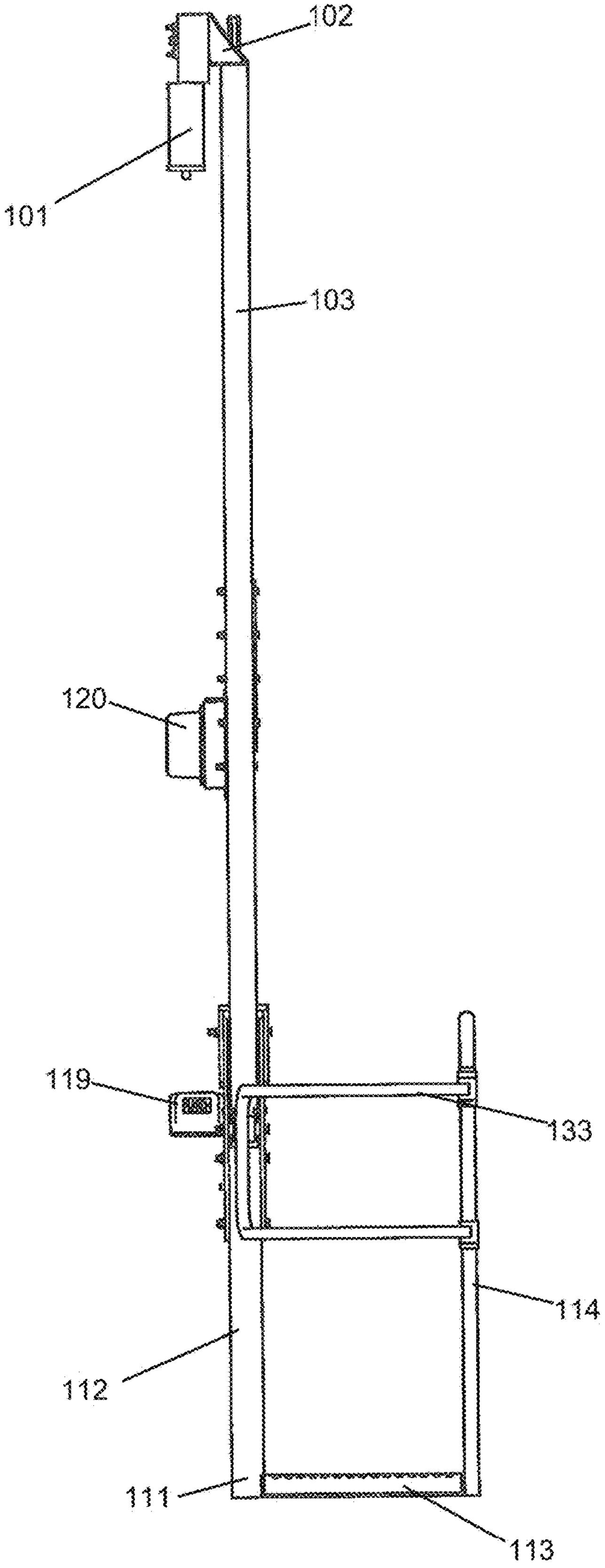
FIG. 4 is a front assembled view of an embodiment of a personnel lift for agricultural vehicles.

FIGS. 3 and 4 show left side and front assembled views of an embodiment of the personnel lift respectively. Like numerals will be used to designate elements already identified. Thus, the motor 101 is shown fastened to the motor mounting bracket 102 at the top of the main column 103. The main column 103 is formed from square tubes spaced apart by spacer to form an open interior space 106. The roller chain 802 can be seen in the open interior space 106 in FIG. 3. Visible in FIG. 3 is the upper mounting bracket 108. Also visible in FIG. 3 is the lower mounting bracket 110. Both FIGS. 3 and 4 show the lifting platform 111 with the support column 112, the platform area 113, and the railing 114. The switch 120 is visible in both FIGS. 3 and 4. The intermediate support 115*a* is clearly visible in FIG. 3 connecting the support column 112 of the lifting platform 110 to the roller box assembly 122. The idler bracket 900 is also clearly visible in FIG. 3.

Figure 10:
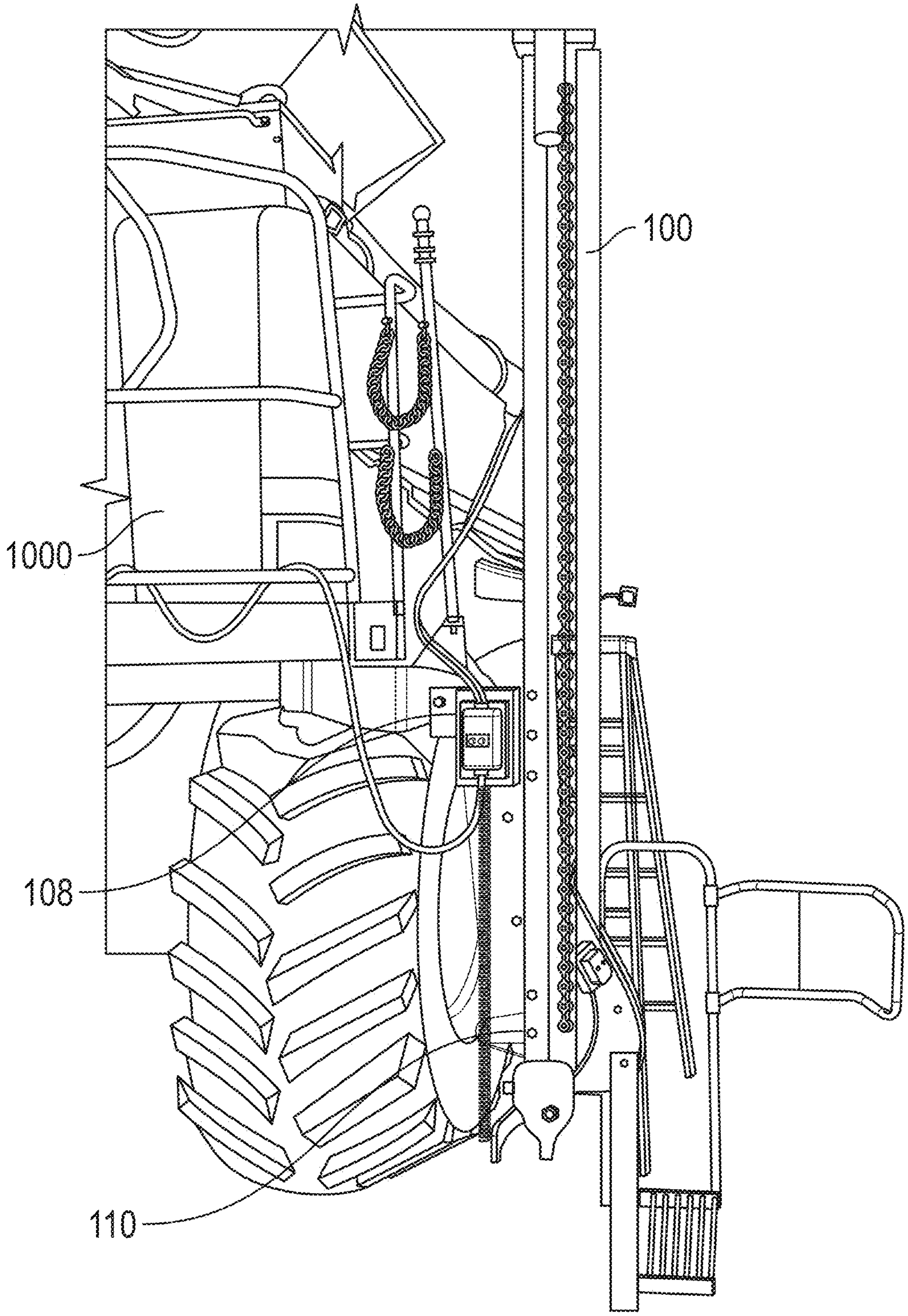
FIG. 10 is a side view of the personnel lift for agricultural vehicles installed on an agricultural vehicle.
Figure 11:
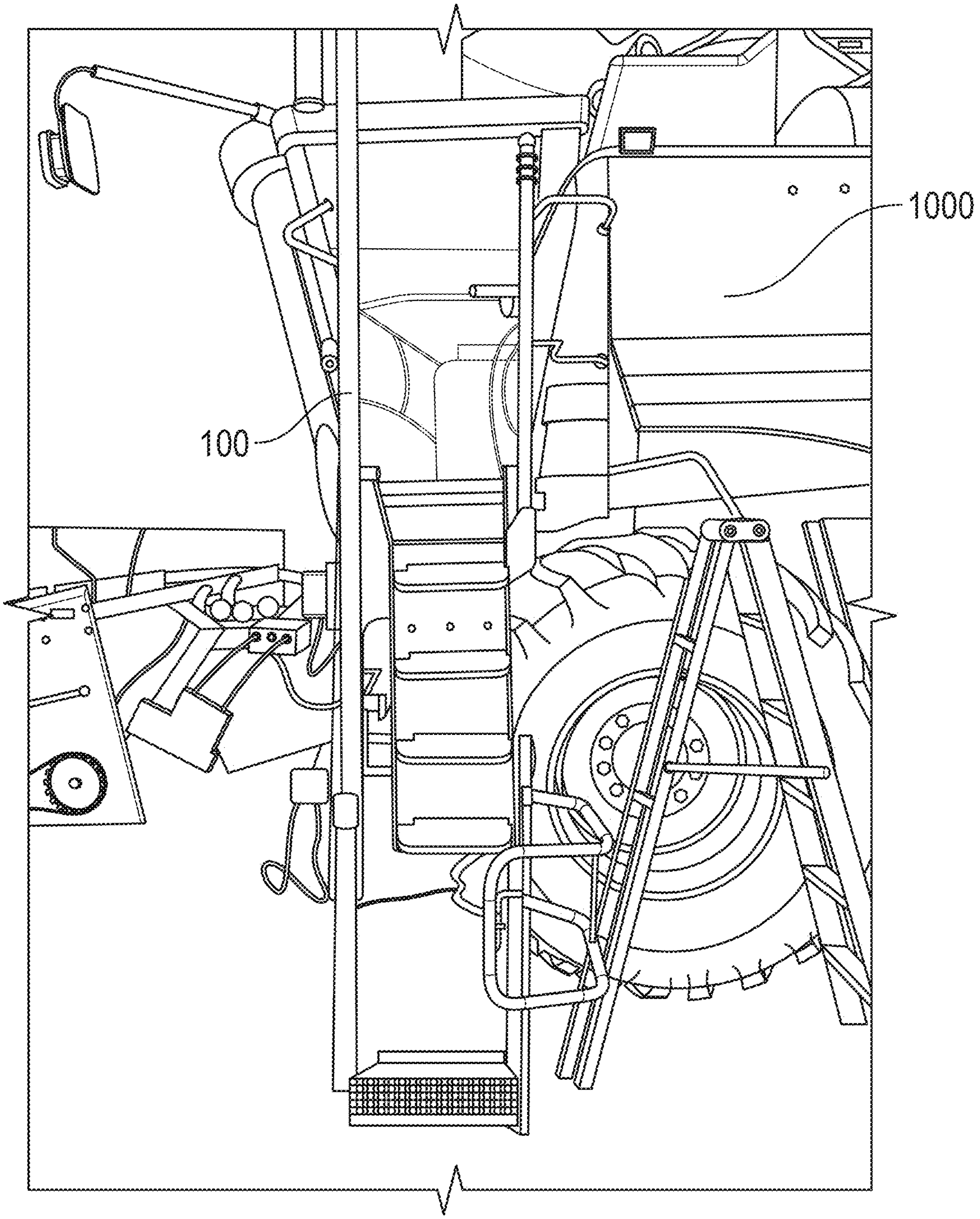
FIG. 11 is a front view of the personnel lift for agricultural vehicles installed on an agricultural vehicle.

FIGS. 10 and 11 are side and front views, respectively, of the personnel lift 100 mounted to an agricultural vehicle 1000. When fully assembled, the personnel lift 100 is mounted to an agricultural vehicle 1000 or the like, via the upper mounting bracket 108 and the lower mounting bracket

110. These brackets are specifically designed for a particular vehicle, based on the shape of the vehicle and options for mounting the lift to the vehicle. It should be appreciated that the personnel lift 100 must be securely fastened to the vehicle 100; otherwise, if the lift were to become separated from the vehicle during operation, the user could suffer substantial personal injuries in the consequent fall from the lift.

In a further embodiment of the personnel lift, a remote control (not shown) for operating the lift may be provided. The remote control may be a hardware device, e.g. a device specifically designed and made to control the lift or it may be a software implementation, as for example, software on a smartphone or similar device that controls the operation of the lift. The remote control may communicate with a receiver on the personnel lift by any means known in the art, for example, by Bluetooth, infrared or RF signals. In operation, the user will select either lifting or descending on the remote and a signal sent from the remote to a receiver on the personnel lift will communicate that command to the receiver. The receiver will then actuate the lift according to that command. The remote control and associated receiver may be programmed with parameters for the control of the lift. For example the remote control and the receiver may have pre-programmed lower and upper limits of travel for the lift. The remote control may be used in addition to, or instead of switches 119 and 120.

It will be appreciated by those of ordinary skill in the art that, while the forgoing disclosure has been set forth in connection with particular embodiments and examples, the disclosure is not intended to be necessarily so limited, and that numerous other embodiments, examples, uses, modifications and departures from the embodiments, examples and uses described herein are intended to be encompassed by the claims attached hereto. Various features of the disclosure are set forth in the following claims.

I claim:

1. A personnel lift for agricultural vehicles comprising:

a main column with a top end, a bottom end, an open interior space and having two opposing interior surfaces and a front exterior surface and left and right exterior surfaces;

a motor mounting bracket coupled to the top end of the main column;

an electric motor coupled to the motor mounting bracket and having an output shaft coupled to a first sprocket;

an idler bracket coupled to the bottom end of the main column, said idler bracket having a second sprocket;

a roller box assembly disposed in the open interior space of the main column, said roller box assembly having a rectangular body with an open interior, an upper exterior surface and a lower exterior surface, wherein said upper exterior surface has an upper chain attachment point and said lower exterior surface has a lower chain attachment point, and wherein the roller box assembly has a first roller disposed in the open interior thereof;

a roller chain disposed on the first and second sprockets, said roller chain connected to the upper and lower chain attachment points on the roller box assembly, said roller chain being in a continuous loop;

an upper mounting bracket connected to the main column, wherein said upper mounting bracket connects the main column to an agricultural vehicle;

a lower mounting bracket connected to the main column, wherein said lower mounting bracket connects the main column to an agricultural vehicle;

a lifting platform with a support column attached thereto;

two intermediate supports coupling the support column of the lifting platform to the roller box assembly, said intermediate supports having guides which ride against the left and right exterior surfaces of the main column, wherein said intermediate supports have a second roller attached thereto; and wherein the first roller contacts the opposing interior surfaces of the main column and the second roller contacts the front exterior surface of the main column; and wherein at least one of the intermediate supports is provided with an elongated slot which allows the lifting platform to be adjusted to be level in relation to the ground.

2. The personnel lift for agricultural vehicles of claim 1, wherein the motor is powered by a battery which is dedicated for use with the personnel lift.

3. The personnel lift for agricultural vehicles of claim 1, wherein the motor is powered by the electrical system of the agricultural vehicle.

4. The personnel lift for agricultural vehicles of claim 1, wherein the lifting platform further comprises a platform area and a railing.

5. The personnel lift for agricultural vehicles of claim 4, wherein the platform area is 18 inches by 18 inches.

6. The personnel lift for agricultural vehicles of claim 1, wherein the guides are comprised of ultra-high molecular weight polyethylene.

7. The personnel lift for agricultural vehicles of claim 1, wherein at least one of the intermediate supports has a switch mounted thereto.

8. The personnel lift for agricultural vehicles of claim 1, wherein the idler bracket is provided with a slot.

9. The personnel lift for agricultural vehicles of claim 8, wherein the idler bracket is further provided with a tensioner that has an adjustable bolt and engages with an axle on which the second sprocket rotates, and wherein said axle is disposed in the slot on the idler bracket.

10. The personnel lift for agricultural vehicles of claim 9, wherein adjusting the bolt on the tensioner adjusts the location of the axle in the slot on the idler bracket and thereby adjusts the tension of the roller chain.

11. The personnel lift for agricultural vehicles of claim 1, wherein a remote control is provided for operation of the personnel lift.

12. The personnel lift for agricultural vehicles of claim 11, wherein the remote control is a hardware device specifically made to control the personnel lift.

13. The personnel lift for agricultural vehicles of claim 11, wherein the remote control is a software implementation on a smart phone that control the operation of the lift.

14. The personnel lift for agricultural vehicles of claim 11, wherein a receiver is provided on the personnel lift that communicates with the remote control.

15. The personnel lift for agricultural vehicles of claim 11, wherein the remote control and the receiver communicate by infrared or RF signals.

16. The personnel lift for agricultural vehicles of claim 14, wherein the remote control and the receiver are programmed with parameters for the control of the personnel lift.

17. The personnel lift for agricultural vehicles of claim 16, wherein the remote control and the receiver have pre-programmed lower and upper limits of travel for the lift.

* * * * *